US007340335B2

(12) United States Patent
Kitaori et al.

(10) Patent No.: US 7,340,335 B2
(45) Date of Patent: Mar. 4, 2008

(54) CONTROLLER OF DRIVER FOR VEHICLE

(75) Inventors: Ichiro Kitaori, Nagoya (JP); Masato Kaigawa, Toyota (JP); Seiji Kuwahara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/590,997

(22) PCT Filed: Aug. 5, 2005

(86) PCT No.: PCT/JP2005/014804

§ 371 (c)(1),
(2), (4) Date: Jan. 17, 2007

(87) PCT Pub. No.: WO2006/030591

PCT Pub. Date: Mar. 23, 2006

(65) Prior Publication Data

US 2007/0162210 A1 Jul. 12, 2007

(30) Foreign Application Priority Data

Sep. 14, 2004 (JP) ............................. 2004-266511

(51) Int. Cl.
*F16H 61/02* (2006.01)
*F02D 29/00* (2006.01)
*G06F 17/00* (2006.01)

(52) U.S. Cl. ............................ 701/51; 701/54; 701/65; 701/70; 477/120; 303/183; 303/192

(58) Field of Classification Search .................. 701/51, 701/54, 55, 65, 70, 90; 303/139, 183, 192; 477/120, 901; 123/336, 337; 180/197
See application file for complete search history.

(56) References Cited

U.S. PATENT DOCUMENTS 5,187,977 A * 2/1993 Koschorek et al. ........... 73/146

(Continued)

FOREIGN PATENT DOCUMENTS

JP 4 337161 11/1992

(Continued)

*Primary Examiner*—Tan Q. Nguyen
(74) *Attorney, Agent, or Firm*—Oblon, Spivak, McClelland, Maier & Neustadt, P.C.

(57) ABSTRACT

A control apparatus for a vehicular drive system, including uphill-drive-force control means and constructed to reduce a degree of uneasiness to be given to the vehicle operator during an uphill-road running of a vehicle. The uphill-drive-force control means is arranged to increase a vehicle drive force during the uphill-road running of the vehicle at a given required vehicle output as compared with a vehicle drive force during a level-road running of the vehicle at substantially the same required vehicle output, for obtaining substantially the same value of acceleration of the vehicle during the uphill-road running as that during the level-road running. Delay control means (131) is provided for delaying initiation of an uphill-drive-force control by the uphill-drive-force control means (130), until first period determining means (130) has determined that a time period $T_{\alpha 1}$ during which acceleration difference G' between reference acceleration $G_b$ and actual acceleration $G_s$ of the vehicle is larger than predetermined uphill-roadway determining threshold $\alpha$ had exceeded a predetermined first time period T1, so that the vehicle drive force F is not increased for the predetermined first period T1 after the moment of initiation of the uphill-road running which requires the uphill-drive-force control by the uphill-drive-force control means 130, whereby immediately after initiation of the uphill-road running, the vehicle operator can feel a decrease of the vehicle acceleration G as expected upon initiation of the uphill-road running, so that the vehicle operator is less likely to feel uneasy during the uphill-road running.

6 Claims, 8 Drawing Sheets

U.S. PATENT DOCUMENTS

| | | | |
|---|---|---|---|
| 5,732,380 A * | 3/1998 | Iwata | 701/85 |
| 5,820,515 A * | 10/1998 | Fukaya et al. | 477/92 |
| 5,829,544 A * | 11/1998 | Ishizu | 180/197 |
| 5,908,461 A * | 6/1999 | Tsukamoto et al. | 701/56 |
| 2003/0229439 A1* | 12/2003 | Polzin | 701/82 |
| 2006/0220455 A1* | 10/2006 | Schmidt | 303/191 |

FOREIGN PATENT DOCUMENTS

| | | |
|---|---|---|
| JP | 7 332444 | 12/1995 |
| JP | 8 28697 | 2/1996 |
| JP | 10 184888 | 7/1998 |
| JP | 2000 27673 | 1/2000 |
| JP | 2000 27674 | 1/2000 |

* cited by examiner

FIG.2

| | C1 | C2 | C3 | C4 | B1 | B2 | B3 | B4 | F0 | F1 | F2 | F3 |
|---|---|---|---|---|---|---|---|---|---|---|---|---|
| Rev | | | O | (O) | | | O | | O | | | |
| N | | | | | | | | | | | | |
| 1st | O | | | (O) | | | | (O) | O | | | O |
| 2nd | O | | | (O) | (O) | O | | | O | O | O | |
| 3rd | O | | O | (O) | (O) | | ● | | O | O | | |
| 4th | O | O | ● | (O) | | | ● | | O | | | |
| 5th | ● | O | O | | O | | ● | | | | | |
| 6th | ● | O | | | ● | O | ● | | | | | |

O : ENGAGED STATE (O) : ENGAGED FOR ENGINE BRAKING

● : ENGAGEMENT NOT CONTRIBUTING POWER TRANSMISSION

CONTROLLER OF DRIVER FOR VEHICLE

TECHNICAL FIELD

The present invention relates to a control apparatus for a vehicular drive system, and more particularly to a control apparatus arranged to increase a vehicle drive force during an uphill-road running of a vehicle at a given required vehicle output as compared with a vehicle drive force during a level-road running of the vehicle at substantially the same required vehicle output, for obtaining substantially the same value of acceleration of the vehicle during the uphill-road running as that during the level-road running.

BACKGROUND ART

There is known a vehicle arranged to adjust its drive force during an uphill-road running of the vehicle at the same operating amount of an accelerator pedal, namely, at the same required vehicle output as that during a level-road running of the vehicle. Patent Document 1 describes an example of such a vehicle. This document discloses a technique to control an engine or the speed ratio of an automatic transmission, for automatically adding to a normal horsepower during a level-road running of the vehicle, an additional horsepower required to run the vehicle on an uphill roadway, for obtaining the same value of acceleration of the vehicle during an uphill-road running of the vehicle on the uphill roadway as that during the level-road running, at substantially the same operating amount of the accelerator pedal during the uphill-road running as that during the level-road running. The additional horsepower is calculated from a gradient resistance of the uphill roadway and a running speed of the vehicle.

[Patent Document 1] JP-7-332444A

Usually, an operator of the vehicle empirically expects a decrease of the acceleration value of the vehicle after initiation of vehicle running on an uphill roadway. If the control as disclosed in the above-identified Patent Document is simply effected during the uphill-road running to obtain the same vehicle acceleration value as that during the level-road running at substantially the same operating amount of the accelerator pedal during the uphill-road running as that during the level-road running, the vehicle operator tends to feel uneasy upon initiation of the uphill-road running because the operator does not feel a decrease of the vehicle acceleration value as expected after initiation of the uphill road running.

The present invention was made in view of the background art described above. It is an object of this invention to provide a control apparatus for a vehicular drive system, which control apparatus includes uphill-drive-force control means and is constructed to reduce a degree of uneasiness to be given to the vehicle operator during an uphill-road running of a vehicle. The uphill-drive-force control means is arranged to control a drive power source and/or an automatic transmission, for thereby increasing a vehicle drive force during the uphill-road running of the vehicle at a given required vehicle output as compared with a vehicle drive force during a level-road running of the vehicle at substantially the same required vehicle output, for obtaining substantially the same value of acceleration of the vehicle during the uphill-road running as that during the level-road running.

DISCLOSURE OF THE INVENTION

The object indicated above may be achieved according to the present invention as defined in claim 1, which provides a control apparatus for a vehicular drive system which has a drive power source and an automatic transmission operatively connected to the drive power source, and in which a drive force is transmitted from the drive power source to a drive wheel of a vehicle through the automatic transmission, the control apparatus including uphill-drive-force control means for controlling the drive power source and/or the automatic transmission to increase a drive force of the vehicle during an uphill-road running of the vehicle at a given required vehicle output as compared with a drive force during a level-road running of the vehicle, at substantially the same required vehicle output, for obtaining substantially the same value of acceleration of the vehicle during the uphill-road running as that during the level-road running, the control apparatus being characterized by comprising (a) delay control means for delaying initiation of a drive force control by the uphill-drive-force control means for the uphill-road running of the vehicle, until a predetermined first time period has passed after a moment of initiation of the uphill-road running.

The present control apparatus described above includes the uphill-drive-force control means for controlling the drive power source and/or the automatic transmission to increase the drive force of the vehicle during the uphill-road running of the vehicle at a given required vehicle output as compared with a drive force during the level-road running of the vehicle, at substantially the same required vehicle output, for obtaining substantially the same value of acceleration of the vehicle during the uphill-road running as that during the level-road running. The control apparatus comprises delay control means for delaying the initiation of the uphill-drive-force control by the uphill-drive-force control means, until the predetermined first time period has passed after the moment of initiation of an uphill running of the vehicle. Accordingly, the vehicle drive force is not increased until the first time period has passed after the initiation of the uphill running of the vehicle. Therefore, immediately after initiation of the uphill-road running of the vehicle, the vehicle operator can feel a decrease of the vehicle acceleration as expected upon initiation of the uphill-road running, so that the vehicle operator is less likely to feel uneasy during the uphill-road running.

The control apparatus according to a preferred form of the invention defined in claim 2 further comprises (a) reference acceleration calculating means for calculating a reference acceleration the vehicle on the basis of an actually generated drive force of the vehicle, (b) actual acceleration detecting means for detecting an actual acceleration of the vehicle, (c) acceleration difference calculating means for calculating an acceleration difference between the reference acceleration calculated by the reference acceleration calculating means and the actual acceleration detected by the actual acceleration detecting means, and (d) acceleration difference determining means for determining whether the acceleration difference calculated by the acceleration difference calculating means is larger than an uphill-roadway determining threshold above which a roadway on which the vehicle is running is considered to be an uphill roadway a gradient of which requires the drive force control by the uphill-drive-force control means, and wherein (e) the delay control means includes first period measuring means for measuring a time period during which the acceleration difference determining means determines that the acceleration difference is held larger than the uphill-roadway determining threshold, and first period determining means for determining whether the time period measured by the first period measuring means has exceeded the predetermined first time period during which the initiation of the drive force control by the uphill-drive-force control means is delayed, the delay control means delaying the initiation of the drive force control by the uphill-drive-force control means until the first period determining means has determined that the time period measured by the first period measuring means had exceeded the predetermined first time period. In the present form of the invention, the acceleration difference between the reference acceleration calculated by the reference acceleration calculating means and the actual acceleration detected by the actual acceleration detecting means is calculated by the acceleration difference calculating means. The acceleration difference determining means is operated to determine whether the acceleration difference calculated by the acceleration difference calculating means is larger than the predetermined uphill-roadway determining threshold. Further, the time period during which the acceleration difference determining means determines that the acceleration difference is held larger than the uphill-roadway determining threshold is measured by the first period measuring means. The delay control means is arranged to delay the initiation of the drive force control by the uphill-drive-force control means until the first period determining means has determined that the time period measured by the first period measuring means had exceeded the predetermined first time period. Accordingly, the vehicle drive force F is not increased for the predetermined first period after the moment of initiation of the uphill-road running of the vehicle on a roadway the gradient of which requires the uphill-drive-force control by the uphill-drive-force control means. Therefore, immediately after initiation of the uphill-road running of the vehicle, the vehicle operator can feel a decrease of the vehicle acceleration as expected upon initiation of the uphill-road running, so that the vehicle operator is less likely to feel uneasy during the uphill-road running.

According to a preferred form of the invention defined in claim 3, the delay control means permits the drive force control by the uphill-drive-force control means when an amount of increase of the required vehicle output has exceeded a predetermined value, even before the predetermined first time period has passed after the moment of initiation of the uphill-road running of the vehicle. In this form of the invention, the delay control means permits the initiation of the uphill-drive-force control by the uphill-drive-force control means, even before the predetermined first time period has passed after the moment of initiation of the uphill-road running of the vehicle, for example, even before the first time period determining means has determined that the first predetermined time period has passed. Accordingly, the vehicle drive force is obtained according to the required vehicle output, so that the vehicle operator does not feel uneasy upon initiation of the uphill-road running. In other words, the amount of change of the required vehicle output exceeding the predetermined value indicates a depressing operation of an accelerator pedal by the vehicle operator to increase the vehicle acceleration as a result of the vehicle operator's expectation of a decrease of the vehicle acceleration immediately before initiation of an uphill-road running of the vehicle. If an increase of the vehicle drive force by the uphill-drive-force control means was inhibited for the predetermined time after the moment of initiation of the uphill-road running, the vehicle operator would feel a decrease of the vehicle acceleration and feel uneasy with this decrease because the vehicle operator desired the increase of the vehicle drive force and depressed the accelerator pedal. In view of this drawback, the uphill-drive-force control by the uphill-drive-force control means is initiated even before expiration of the predetermined first time period, if the amount of change of the required vehicle output has exceeded the predetermined value. Accordingly, the vehicle operator does not feel uneasy upon initiation of the uphill-road running.

The control apparatus according to a preferred form of the invention defined in claim 4 further comprises uphill-drive-force-control termination determining means for continuing the drive force control by the uphill-drive-force control means for a predetermined second time period after a moment of termination of the uphill-road running of the vehicle. In this form of the invention, the drive force control by the uphill-drive-force control means is continued by the uphill-drive-force-control termination determining means for the predetermined second time period after the moment of termination of the uphill-road running of the vehicle. Thus, the vehicle drive force is kept increased for the predetermined second time period even after the termination of the uphill-road running of the vehicle, thereby preventing instability of the uphill-drive-force control by the uphill-drive-force control means due to a high response of the termination of the uphill-drive-force control to a change of the roadway gradient, with which the vehicle operator feels uneasy.

According to a preferred form of the invention defined in claim 5, the uphill-drive-force-control termination determining means includes second period measuring means for measuring a time period during which the acceleration difference determining means continues to determine that the vehicle acceleration difference is not larger than the uphill-roadway determining threshold, and second period determining means for determining whether the time period measured by the second period measuring means has exceeded the predetermined second time period for which the drive force control by the uphill-drive-force control means is continued, and the uphill-drive-force-control termination determining means continues the drive force control by the uphill-drive-force control means for the predetermined second time period until the second period determining means has determined that the time period measured by the second period measuring means has exceeded the predetermined second time period. In this form of the invention, the time period during which the acceleration difference determining means continues to determine that the vehicle acceleration difference is not larger than the uphill-roadway determining threshold is measured by the second period measuring means, and the uphill-drive-force control by the uphill-drive-force control means is continued until the second period determining means has determined that the time period measured by the second period measuring means has exceeded the predetermined second time period. Accordingly, the vehicle drive force is kept increased for the predetermined second time period even after the moment of termination of the uphill-road running of the vehicle on a roadway the gradient θ of which requires the uphill-drive-force control by the uphill-drive-force control means. Therefore, it is possible to prevent instability of the uphill-drive-force control by the uphill-drive-force control means due to a high response of the termination of the uphill-drive-force control to a change of the roadway gradient, with which the vehicle operator feels uneasy.

The above-described required vehicle output, which is a parameter indicative of the output amount of the vehicle as required by the vehicle operator, is preferably selected from among an operating amount of an accelerator pedal, an angle of opening of a throttle valve, an amount of injection of a fuel into a chamber within an intake pipe of the engine or cylinders of the engine, and a quantity of air introduced into the intake pipe of the engine.

Preferably, the above-described drive power source is an internal combustion engine such as a gasoline engine or a diesel engine. The drive power source may include an auxiliary vehicle drive power source such as an electric motor (s) in addition to the above-indicated engine. Alternatively, the drive power source consists of an electric motor or electric motors only. Where the drive power source includes an electric motor, the required vehicle output may be represented by an amount of electric current discharged from a battery device provided to drive the electric motor, for example.

The above-described automatic transmission preferably consists of one device or a plurality of devices selected from among: various kinds of multiple-step planetary gear type transmission having a plurality of gear positions, for example, four, five, six, seven or eight forward-drive positions, which are selectively established by selectively connecting rotary elements of a plurality of planetary gear sets to each other through frictional coupling devices; a belt-and-pulley type of continuously-variable transmission the speed ratio of which is continuously variable by changing effective diameters of a pair of pulleys connected to each other by a power transmission member in the form of a transmission belt; a toroidal type of continuously variable transmission the speed ratio of which is continuously variable by changing an angle of intersection between a common axis of rotation of a pair of coned members and an axis of rotation of each of a plurality of rollers squeezed between the pair of coned members; a synchronous-meshing parallel two-axes type of automatic transmission including a plurality of pairs of mutually meshing transmission gears which are mounted on two axes and one of which is selectively placed in a power transmitting state by a synchronizer device operated by a hydraulic actuator; and an automatic transmission, such as a hybrid vehicle drive system operable functioning as an electrically operable continuously-variable transmission, including a differential mechanism constituted, for example, by a planetary gear device operable to distribute an output of an engine to a first electric motor and an output shaft, and further including a second electric motor provided on the output shaft of the differential mechanism, and wherein a major portion of the output of the engine is mechanically transmitted to vehicle drive wheels with a differential function of the differential mechanism, while the remaining portion of the engine output is electrically transmitted to the second electric motor through an electric path between the first and second electric motors, whereby the speed ratio of the automatic transmission is electrically variable.

The automatic transmission may be of a transversely mounted type as provided on an FF (front-engine front-drive) vehicle, wherein the axis is parallel to the direction of width of the vehicle, or of a longitudinally mounted type as provided on an FR (front-engine rear-drive) vehicle, wherein the axis is parallel to the longitudinal direction of the vehicle.

Preferably, each of the frictional coupling devices indicated above is a hydraulically operated frictional coupling device such as a multiple-disc or single-disc clutch or brake, or a belt-type brake, which is placed in its engaged state by a hydraulic actuator, which is operated with a pressurized working fluid delivered from an oil pump. This oil pump may be driven by the vehicle drive power source, or an electric motor or any other exclusive drive source different from the vehicle drive power source. The clutch or brake may be an electromagnetically operated coupling device rather than the hydraulically operated frictional coupling device, such as an electromagnetic clutch or a magnetic-power clutch.

The above-described drive power source and the automatic transmission are operatively connected to each other, preferably through a damper, a direct-coupling clutch, a damper equipped with a direct-coupling clutch or a fluid-actuator power transmitting device, which is interposed between the drive power source and the input shaft of the automatic transmission. However, the drive power source and the input shaft of the automatic transmission may be held directly connected to each other. The above-indicated fluid-operated power transmitting device may be a torque converter equipped with a lock-up clutch, or a fluid coupling.

BRIEF DESCRIPTION OF THE DRAWING

FIG. 2 is a view indicating engaged and released states of clutches and brakes to establish operating positions of an automatic transmission shown in FIG. 1.

EXPLANATION OF REFERENCE SIGNS

Figure 1:
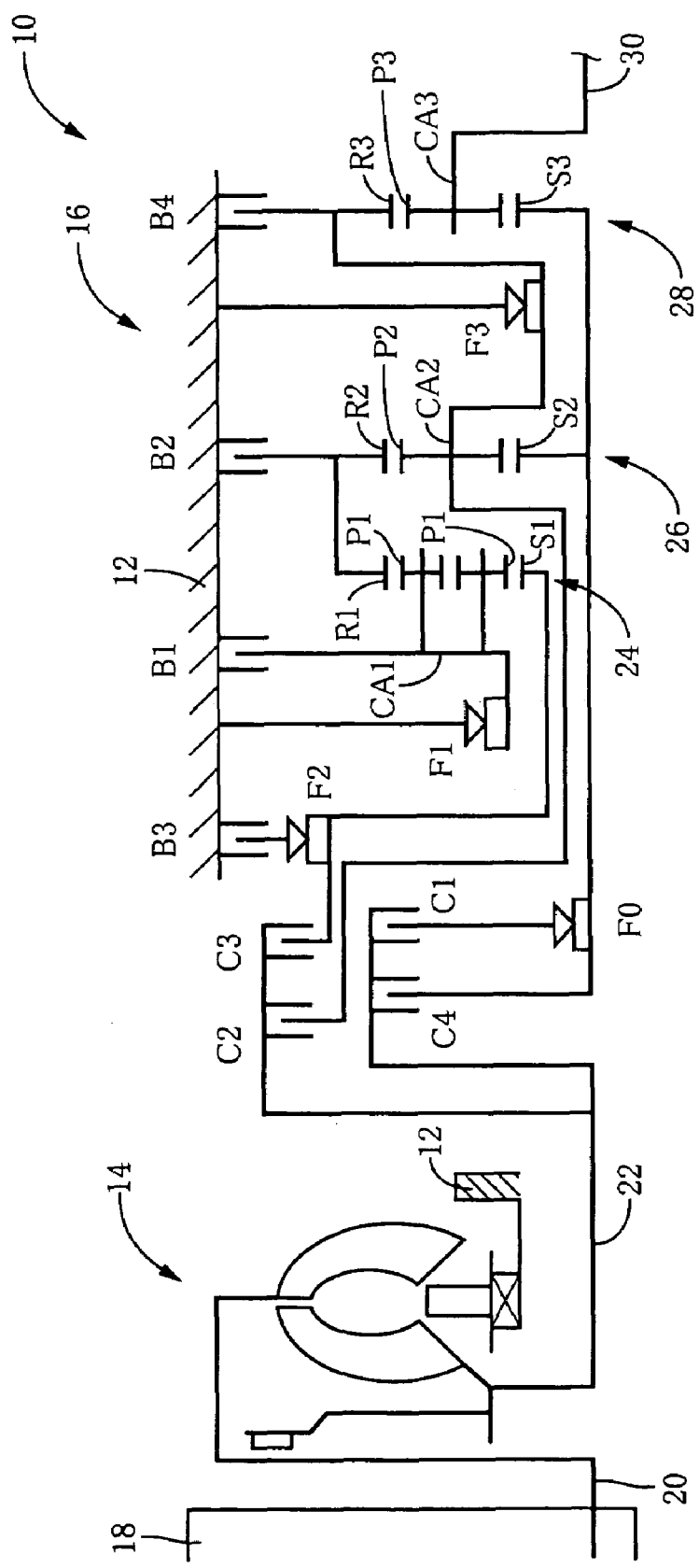
FIG. 1 is a schematic view explaining an arrangement of a vehicular drive system to which the present invention is applicable.

10: Vehicular drive system
16: Automatic transmission
18: Engine (Drive power source)

90: Electronic control device (Control apparatus)
120: Reference acceleration calculating means
122: Actual acceleration calculating means
124: Acceleration difference calculating means
130: Uphill-drive-force control means
132: First period measuring means
134: First period determining means
142: Second period measuring means
144: Second period determining means

BEST MODE FOR CARRYING OUT THE INVENTION

There will be described in detail an embodiment of the present invention, referring to the drawings.

Referring to the schematic view of FIG. 1, there is shown an arrangement of a vehicular drive system (hereinafter referred to as "drive system") 10 to which the present invention is applicable. The drive system 10 includes a torque converter 14 provided with a lock-up clutch, and an automatic transmission in the form of a step-variable automatic transmission (hereinafter referred to as "automatic transmission") 16. The torque converter 14 and the automatic transmission 16 are disposed within a stationary member in the form of a transmission casing (hereinafter referred to "casing") 12 attached to a body of a vehicle. Since the drive system 10 is symmetrical with respect to its axis, a lower half of the drive system 10 located below the axis as seen in the schematic view of FIG. 1 is not shown in this schematic view.

The automatic transmission 16 includes an input shaft 22, a double-pinion type first planetary gear set 24, a single-pinion type second planetary gear set 26, a single-pinion type third planetary gear set 28, and an output shaft 30, which are arranged in the order of description. The input shat 22 is operatively connected through a torque converter 14 to a crankshaft 20 of an internal combustion engine in the form of an engine 18 such as a gasoline or diesel engine, which serves as a drive power source for running the vehicle. The speed of a rotary motion of the input shaft 22 is changed into the speed of a rotary motion of the output shaft 30. The input shaft 22, which is an input rotary member of the automatic transmission 16, is a turbine shaft of the torque converter 14 rotated by the engine 18, while the output shaft 30 is an output rotary member of the automatic transmission 16, which is operatively connected to right and left drive wheels of the vehicle through a differential gear device (final speed reducing device) and a pair of axles, for example.

The first planetary gear set 24 includes a sun gear S1, a plurality of pairs of mutually meshing pinion gears P1, a carrier CA1 supporting the pinion gears P1, a ring gear R1 meshing with the sun gear S1 through the pinion gears P1. The carrier CA1 supports the pinion gears P1 such that each of the pinion gears P1 is rotatable about its axis and such that the pinion gears P1 are rotatable about the axis of the first planetary gear set 24. The second planetary gear set 26 includes a sun gear S2, a pinion gear P2, a carrier CA2 supporting the pinion gear P2, a ring gear R2 meshing with the sun gear S2 through the pinion gear P2. The carrier CA2 supports the pinion gear P2 such that the pinion gear P1 is rotatable about its axis and about the axis of the second planetary gear set 26. The carrier CA1 supports the pinion gears P1 such that each of the pinion gears P1 is rotatable about its axis and such that the pinion gears P1 are rotatable about the axis of the first planetary gear set 24. The third planetary gear set 26 includes a sun gear S3, a pinion gear P3, a carrier CA3 supporting the pinion gear P3, a ring gear R3 meshing with the sun gear S3 through the pinion gear P3. The carrier CA3 supports the pinion gear P3 such that the pinion gear P3 is rotatable about its axis and about the axis of the third planetary gear set 28.

In the automatic transmission 16, the sun gear S1 of the first planetary gear set 24 is selectively connected to the input shaft 22 through a clutch C3, and is selectively fixed to the casing 12 through a one-way clutch F2 and a brake B3, so as to inhibit a rotary motion of the sun gear S1 in a reverse direction (in a direction opposite to the direction of the rotary motion of the input shaft 22). The carrier CA1 of the first planetary gear set 24 is selectively fixed to the casing 12 through a brake B1, and a rotary motion of the carrier CA1 in the reverse direction is always inhibited by a one-way clutch F1 disposed in parallel with the brake B1. The ring gear R1 of the first planetary gear set 24 is formed integrally with the ring gear R2 of the second planetary gear set 26, and is selectively fixed to the casing 12 through a brake B2. The sun gear S2 of the second planetary gear set 26 is formed integrally with the sun gear S3 of the third planetary gear set 28, and is selectively connected to the input shaft 22 through a clutch C4 and selectively connected to the input shaft 22 through a one-way clutch F0 and a clutch C1, so as to inhibit a rotary motion of the sun gear S2 in the reverse direction relative to the input shaft 22. The carrier CA2 of the second planetary gear set 26 is formed integrally with the ring gear R3 of the third planetary gear set 28, and is selectively connected to the input shaft 22 through a clutch C2. The carrier CA2 is selectively fixed to the casing 12 through a fourth brake B4, and a rotary motion of the carrier CA2 in the reverse direction is always inhibited by a one-way clutch F3 disposed in parallel with the brake B4. The carrier CA3 of the third planetary gear set 28 is formed integrally with the output shaft 30.

The above-described clutches C1-C4 and brakes B1-B4 (hereinafter referred simply as "clutches C" and "brakes B", where it is not necessary to specify the individual clutches or brakes are hydraulically operated frictional coupling devices, each of which may be a multiple-disc clutch or brake having a plurality of mutually superposed friction plates which are forced against each other by a hydraulic actuator. For example, the automatic transmission 16 is placed in a selected one of six forward-drive positions ("$1^{st}$", through "$6^{th}$") and one rear-drive position ("Rev"), by selectively engaging and releasing the clutches C and brakes B, as indicated in FIG. 2. The forward-drive positions "$1^{st}$" through "$6^{th}$" have respective different speed ratios γ (rotating speed $N_{IN}$ of the input shaft 22/rotating speed $N_{OUT}$ of the output shaft 30), which decrease in the order of description. The speed ratio γ of the forward-drive position "$4^{th}$" is 1.0. In FIG. 2, "o" and the blank respectively represent the engaged state and the released state, and "(o)" represents the engagement for engine braking, while "•" represents the engagement not contributing power transmission.

Figure 3:
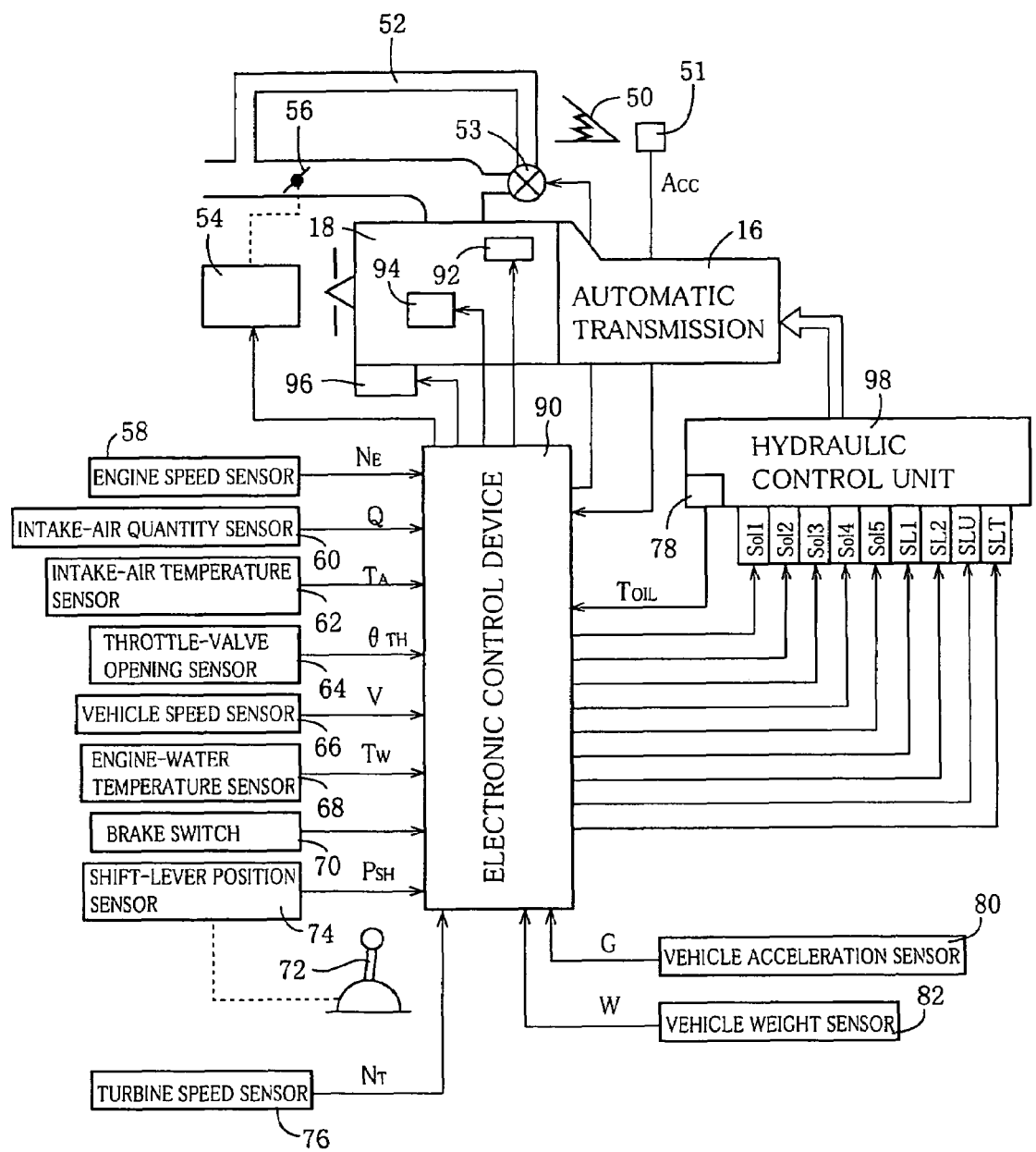
FIG. 3 is a view showing input and output signals of an electronic control device provided to control an engine and the automatic transmission shown in FIG. 1.

Referring to the block diagram of FIG. 3, there are shown major elements of a control system of the vehicle provided to control the engine 18 and the automatic transmission 16 shown in FIG. 1. The control system includes an electronic control device 90 principally constituted by a so-called "microcomputer" incorporating a CPU, a RAM, a ROM and an input-output interface. The CPU processes input signals according to control programs stored in the ROM, while utilizing a temporary data storage function of the RAM, to control effect various controls such as an output control of the engine 18 and a shift control of the automatic transmission 16. The electronic control device 90 is considered to include an engine control portion, and a transmission control portion.

In FIG. 3, there is shown an accelerator sensor 51 operable to detect an operating angle $A_{CC}$ of an accelerator pedal 50. A signal representative of the operating angle $A_{CC}$ is applied to the electronic control device 90. Since the accelerator pedal 50 is operated by the vehicle operator by an amount corresponding to an output of the vehicle as required by the vehicle operator, the accelerator pedal 50 serves as a vehicle accelerating member, and the operating amount $A_{CC}$ represents the output of the vehicle required by the vehicle operator. In an intake pipe of the engine 18, there is disposed an electronic throttle valve 56 an opening angle $\theta_{TH}$ of which is changed by a throttle actuator 54. A by-pass passage 52 is provided so as to by-pass the electronic throttle valve 56. In this by-pass passage 52, there is disposed an ISC valve (idling speed control valve) 53 operable to control the intake air quantity of the engine 8 when the electronic throttle valve 56 is placed in its fully closed position, so that an idling speed $N_{IDL}$ of the engine 18 is controlled by the ISC valve 53.

The electronic control device 90 receives output signals of various sensors and switches such as: a signal representative of a speed $N_E$ of the engine 18 detected by an engine speed sensor 58; a signal representative of an intake air quantity Q of the engine 18 detected by an intake-air quantity sensor 60; a signal representative of a temperature $T_A$ of the intake air detected by an intake-air temperature sensor 62; a signal representative of the opening angle $\theta_{TH}$ of the electronic throttle valve 56 detected by a throttle-valve opening sensor 64 equipped with an engine idling switch operable to detect the fully closed state of the electronic throttle valve 56 (idling state of the engine); a signal representative of a running speed V of the vehicle (rotating speed $N_{OUT}$ of the output shaft 30) detected by a vehicle speed sensor 66a; a signal representative of a temperature Tw of cooling water of the engine 18 detected by an engine-water temperature sensor 68; a signal representative of an operation of a foot brake pedal for operating a service brake system of the vehicle, which is detected by a brake switch 70; a signal representative of a currently selected operating position $P_{SH}$ of a shift lever 72 detected by a sift-lever position sensor 74; a signal representative of a turbine speed $N_T$ (=rotating speed $N_{IN}$ of the input shaft 22) detected by a turbine speed sensor 76; a signal representative of a temperature TOIL of the working fluid of a hydraulic control unit 98 detected by an AT-oil temperature sensor 78; a signal representative of an acceleration value G of the vehicle detected by a vehicle acceleration sensor 80; and a signal representative of a weight W of the vehicle detected by a vehicle weight sensor 82.

Figure 4:
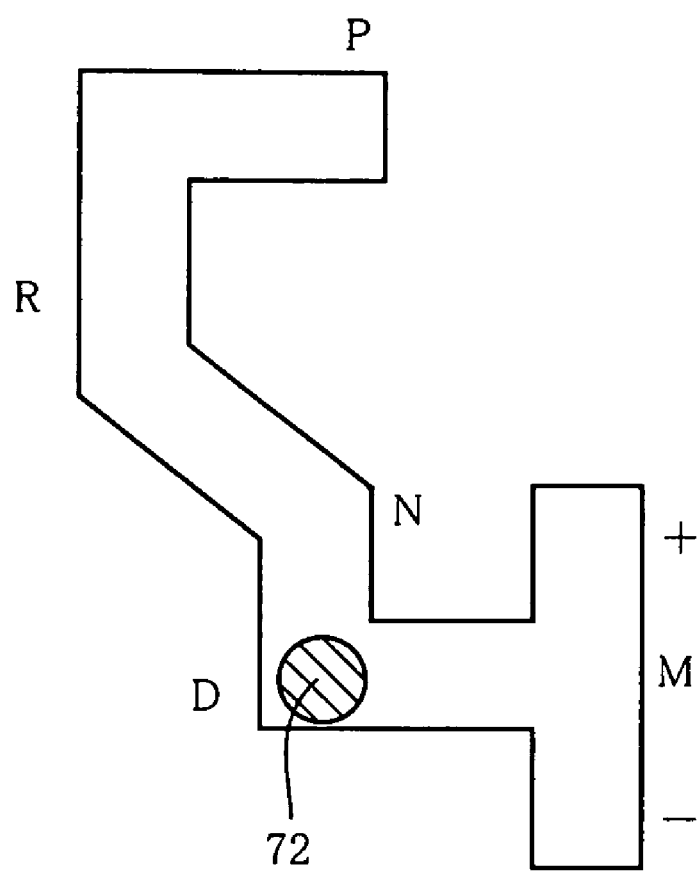
FIG. 4 is a view showing operating positions of a shift lever shown in FIG. 3.

The shift lever 72 is disposed near a vehicle-operator's seat of the vehicle, and is manually operable to a selected one of five positions P, R, N, D and M, as shown in FIG. 4. The position P is a parking position in which a power transmitting path in the automatic transmission 16 is cut off, and the output shaft 30 is mechanically locked by a mechanical parting mechanism, to inhibit a rotary motion of the output shaft 30. The position R is a rear-drive position for rotating the output shaft 30 of the automatic transmission 16 in the reverse direction. The position N is a power-transmission cut-off position for cutting off the power transmitting path in the automatic transmission 16. The position D is an automatic forward-drive position permitting an automatic shifting action of the automatic transmission 16 to a selected one of a first-speed position through, a sixth-speed position.

The position M is a manual forward-drive position for changing the number of the speed positions of the automatic transmission 16 available for the automatic shifting action, namely, for selecting the highest-speed position available, to thereby manually shift the automatic transmission 16. The shift lever 72 is operable from the position M to a shift-up position "+" for manually shifting up the automatic transmission 16 or a shift-down position "−" for manually shifting down the automatic transmission 16. The shift-lever position sensor 74 described above detects the presently selected operating position PSH of the shift leer 72.

The hydraulic control unit 98 includes solenoid valves Sol1-Sol5 and linear solenoid valves SL1 and SL2 for controlling the shifting actions of the automatic transmission 16, a liner solenoid valve SL'U for controlling the hydraulic pressure of the lock-up clutch of the torque converter 14, and a linear solenoid valve SLT for controlling the line pressure. The pressurized working fluid is supplied from the hydraulic control unit 98 to the lock-up clutch, and is also used for lubricating the components of the automatic transmission 16. The hydraulic control unit 98 further includes a manual valve connected to the shift lever 72 through a cable or linkage, so that the manual valve is mechanically operated in response to an operation of the shift lever 72, to effect hydraulic switching operations of the hydraulic circuits in the hydraulic control unit 98. When the shift lever 72 is operated to the position D or M, a forward-drive pressure $P_D$ is generated to mechanically establish a forward-drive hydraulic circuit, permitting the automatic transmission 16 to be shifted to a selected one of the first-speed position ("$1^{st}$") through the sixth-speed position ("$6^{th}$") which are the forward-drive positions for forward running of the vehicle. When the shift lever 72 is operated to the position R, a rear-drive hydraulic circuit is mechanically established to establish the rear-drive position "Rev" indicated in FIG. 2. When the shift lever 72 is operated to the position N, a neutral hydraulic circuit is mechanically established to release all of the clutches C and brakes B.

Figure 5:
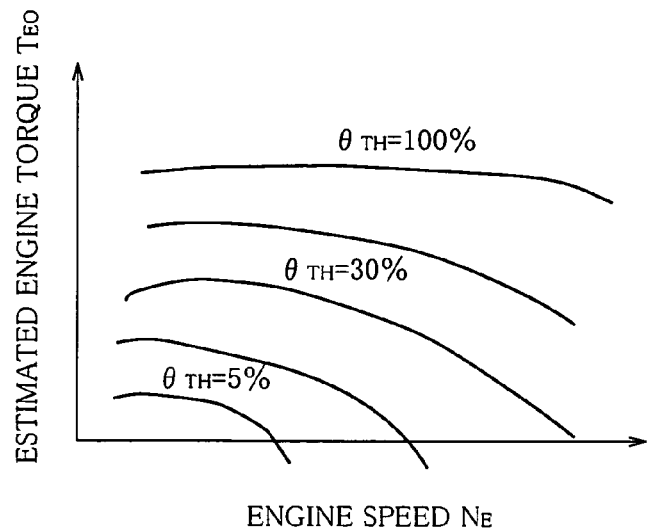
FIG. 5 is a view (map) indicating a stored relationship for calculating an engine torque as an estimated engine torque on the basis of an opening angle of a throttle valve and an operating speed of the engine.

For controlling the output of the engine 18, the electronic throttle valve 56 is controlled by the throttle actuator 54, and a fuel injecting valve 92 is controlled to control the amount of injection of a fuel. Further, an igniter 94 is controlled to control the ignition timing, and the ISC valve 53 is controlled to control the idling speed. The opening angle $\theta_{TH}$ of the electronic throttle valve 56 is controlled by the throttle actuator 54, so as to obtain a target engine torque $T_E^*$ determined on the basis of the actual engine speed $N_E$ (which is determined by the actual vehicle speed V and the speed ratio γ of the automatic transmission 16), and according to a stored map which is obtained by experimentation and which represents a relationship among the throttle valve opening angle $\theta_{TH}$, engine speed $N_E$ and an estimated value $T_{E0}$ of the engine torque, as shown in FIG. 5 by way of example. The engine 18 is started by cranking of the crankshaft 20 by a starter (electric motor) 96.

Figure 6:
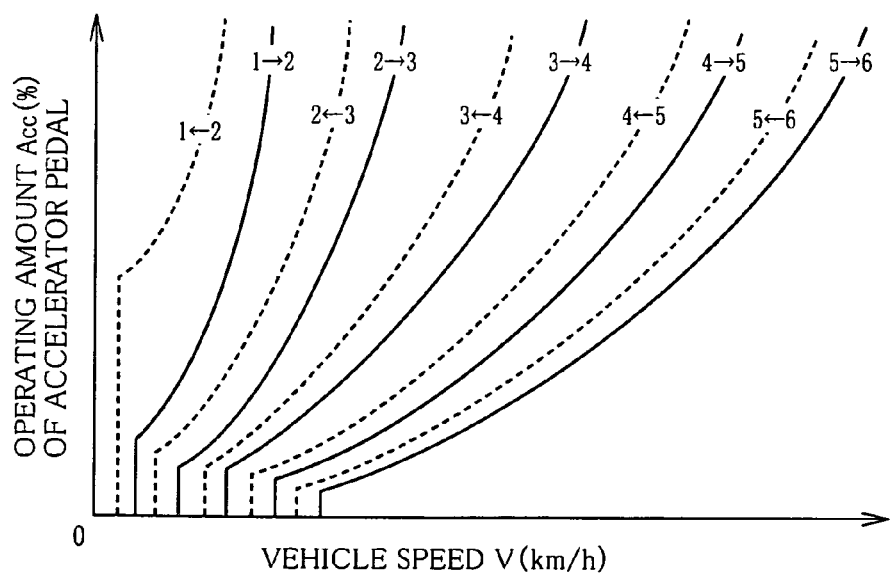
FIG. 6 is a view indicting an example of shift boundary lines (shifting map) used by the electronic control device of FIG. 3 to control shifting actions of the automatic transmission.

An automatic shifting mode of the automatic transmission 16 is established when an operation of the shift lever 72 to the position D is detected by the output signal of the shift-lever position sensor 74. In the automatic shifting mode, a determination as to whether the automatic transmission 16 should be shifted up or down is made on the basis of the actual vehicle speed V and the actual accelerator pedal operating amount $A_{CC}$, and according to a predetermined shifting map which is obtained by experimentation and which represents a relationship between the vehicle speed V and the accelerator pedal operating amount $A_{CC}$, as shown in FIG. 6 by way of example. The determined shift-up or shift-down action of the automatic transmission 16 is effected by energizing and de-energizing the appropriate solenoid valves Sol1-Sol5 within the hydraulic control unit 98, and controlling amounts of electric current to be applied to the linear solenoid valves SL1, SL2 within the hydraulic control unit 98, so that the hydraulic circuits are switched to engage and release the appropriate clutches C and brakes B to shift-up or shift-down the automatic transmission 16 to a selected one of the six forward-drive positions "1$^{st}$" through "6$^{th}$", while the hydraulic pressures to be applied to the clutches C and brakes B in the process of the engaging and releasing actions are controlled. It is noted that the determination as to whether the automatic transmission 16 should be shifted up or down may be made on the basis of the throttle valve opening angle TH, the intake air quantity Q, a gradient of the roadway surface, and any other parameters.

In FIG. 6, solid lines represent shift-up boundary lines while broken lines represent shift-down boundary lines. These shift-up and shift-down boundary lines are formulated such that the automatic transmission 16 is shifted down to increase its speed ratio γ (=input shaft speed $N_{IN}$/output shaft speed $N_{OUT}$) as the vehicle speed V is lowered or as the accelerator pedal operating amount $A_{CC}$ is increased. In FIG. 6, "1" through "6" indicate the first-speed position "1$^{st}$" through the sixth-speed position "6$^{th}$", respectively. When the accelerator pedal has a given operating amount $A_{CC}$ (%) represented by a horizontal straight line in the coordinate system of FIG. 6, the determination as to whether the automatic transmission 16 should be shifted up or down is made depending upon whether a point representative of the actual vehicle speed V and lying on the above-indicated horizontal straight line has moved across any one of the shift-up and shift-down boundary lines, that is, whether the actual vehicle speed V has become higher or lower than a threshold value (shift-up or shift-down value) $V_S$ lying on any one of the shift-up or shift-down values. Namely, each shift-up or shift-down boundary line consists of a series of threshold values $V_S$ of the vehicle speed V represented by the stored shifting map.

Figure 7:
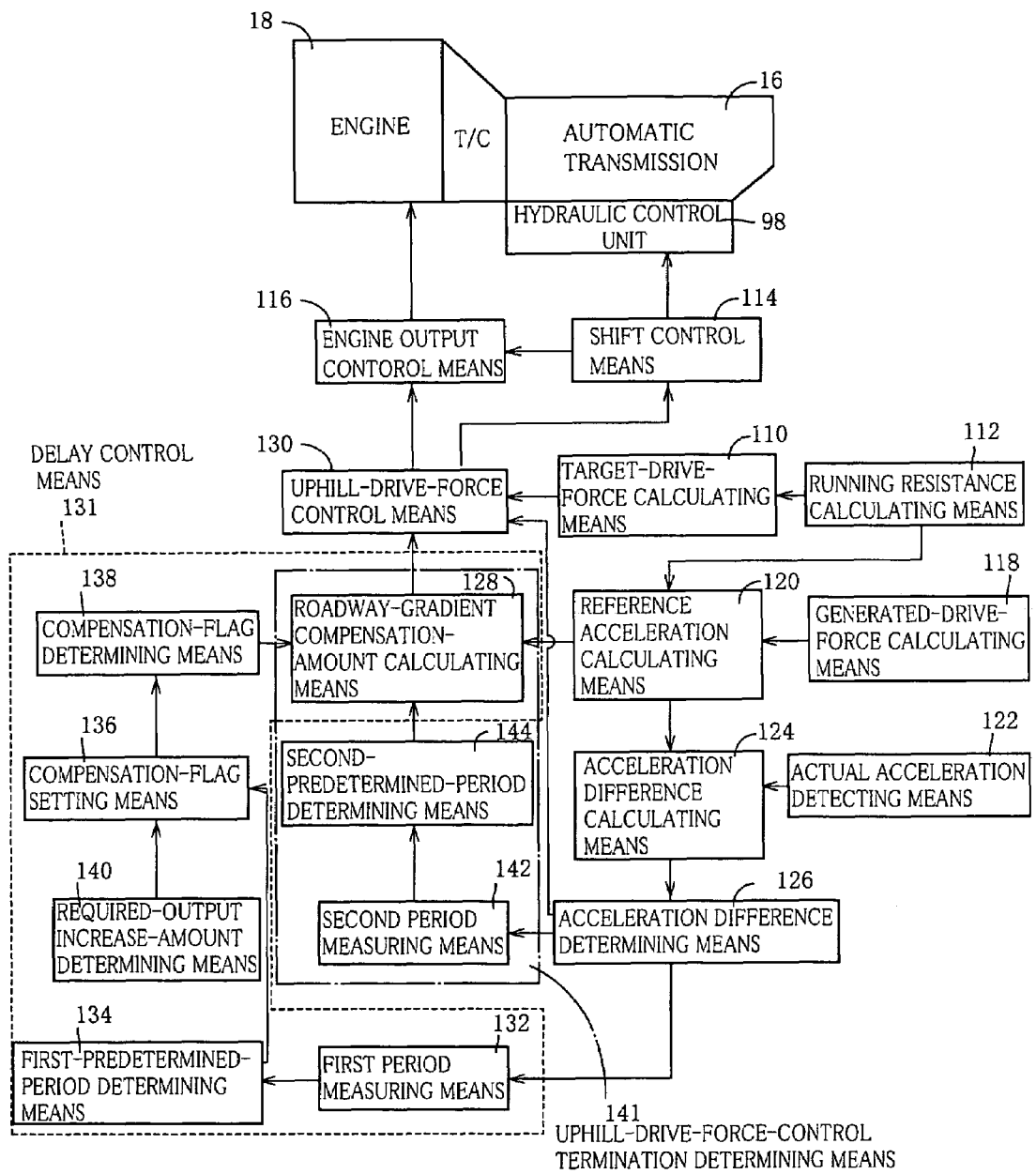
FIG. 7 is a functional block diagram showing major control functions of the electronic control device of FIG. 3.

Referring to the functional block diagram of FIG. 7, there are shown major functional means incorporated in the electronic control device 90 to perform control operations for effecting an uphill-drive-force control to increase a vehicle drive force during an uphill-road running of the vehicle at a given required vehicle output (at a given accelerator pedal operating amount $A_{CC}$, for example) as compared with a vehicle drive force during a level-road running of the vehicle at substantially the same required vehicle output, for obtaining substantially the same acceleration value G of the vehicle during the uphill-road running as that during the level-road running, while reducing a degree of uneasiness to be given to the user (vehicle operator and occupants) during the uphill-road running.

Figure 8:
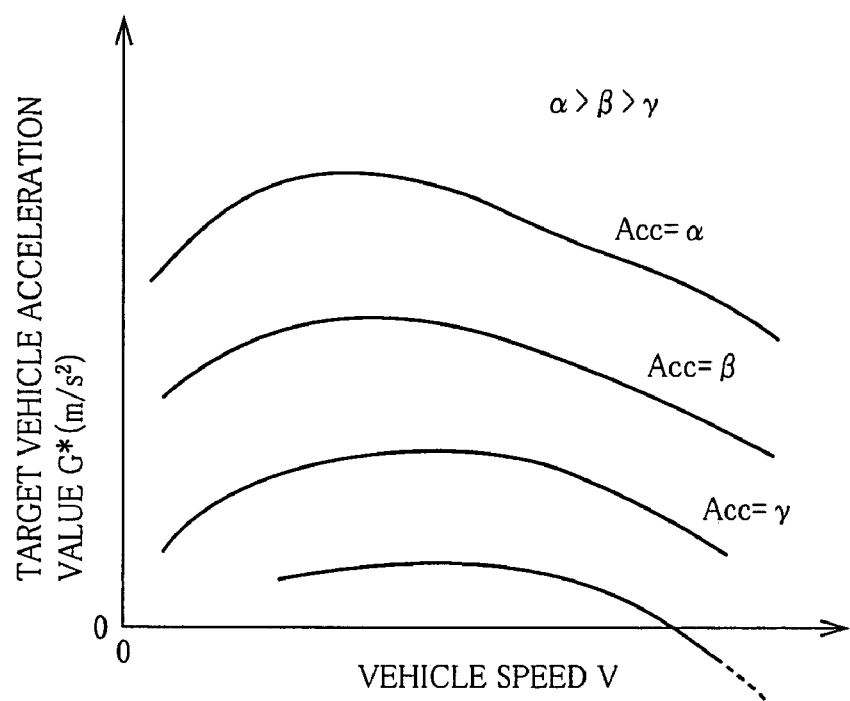
FIG. 8 is a view indicating a stored relationship (map) which is obtained by experimentation and which is used to determine a target acceleration value of a vehicle on the basis of a running speed of the vehicle and an operating amount of an accelerator pedal.

Target-drive-force calculating means 110 shown in FIG. 7 is arranged to determine a target vehicle acceleration value G* on the basis of a vehicle drive force as required by the vehicle operator, for example, the accelerator pedal operating amount $A_{CC}$ applied to the electronic control device 90, and calculate a target drive force $F_{tgt}$ of the vehicle at its drive wheels on the basis of the determined target vehicle acceleration value G* and a running resistance $f_{res}$ of the vehicle on a level roadway calculated by running-resistance calculating means 112 which will be described. For instance, the target-drive-force calculating means 110 determines the target vehicle acceleration value G* on the basis of the actual vehicle speed V and accelerator pedal operating amount $A_{CC}$, and according to a stored map of FIG. 8 which is obtained by experimentation and which represents a relationship among the accelerator pedal operating amount $A_{CC}$, the vehicle speed V and the target vehicle acceleration value G*. The target-drive-force calculating means 110 calculates the target vehicle drive force $F_{tgt}$, according to an equation $F_{tgt}=f(G^*)=W \times G^*+f_{res}$, on the basis of the determined target vehicle acceleration value G*, the vehicle running resistance $f_{res}$, and a weight W of the vehicle applied to the electronic control device 90.

The above-described running-resistance calculating means 112 is arranged to calculate the vehicle running resistance $f_{res}$ on the level roadway. The vehicle running resistance $f_{res}$ is a sum of a rolling resistance $R_r$ (=$\mu_r \times W$, wherein $\mu_r$ and W respectively represent a rolling resistance factor and a vehicle weight) and an air resistance $R_a$ (=$\mu_a \times A \times V^2$, wherein $\mu_a$, A and V respectively represent an air resistance factor, a surface area of projection of the vehicle as seen from the vehicle front, and the vehicle speed V). Namely, $f_{res}=R_r+R_a$. For instance, the running-resistance calculating means 112 calculates the running resistance $f_{res}$ on the basis of the actual vehicle speed V and according to a stored map which is obtained by experimentation and which represents a relationship between the vehicle running resistance $f_{res}$ and the vehicle speed V.

Shift control means 114 is arranged to make a determination of a shifting action on the basis of the actual vehicle speed V and accelerator pedal operating amount $A_{CC}$, and according to the stored shifting map shown in FIG. 6 by way of example, and commands the hydraulic control unit 98 to effect the determined shifting action of the automatic transmission 16, for thereby automatically placing the automatic transmission 16 in an appropriate one of its speed positions. For example, the shift control means 114 commands the hydraulic control unit 98 to engage the brake B3 to establish the second-speed position if the actual vehicle speed V has exceeded a threshold value $V_{1-2}$ for shifting up the automatic transmission 16 from the first-speed position to the second-speed position while the automatic transmission 16 is placed in the first speed position.

Engine-output control means 116 is arranged to calculate the target engine torque $T_E^*$ on the basis of the target drive force $F_{tgt}$ calculated by the target-drive-force calculating means 110, and control the throttle actuator 54 to establish an opening angle $\theta_{TH}^*$ of the electronic throttle valve 56 for obtaining the calculated target engine torque $T_E^*$. For instance, the engine-output control means 116 calculates the target engine torque $T_E^*$ according to an equation $T_E^*=F_{tgt}/\gamma/i \times r_w$, on the basis of the target drive force $F_{tgt}$, a speed ratio γ of the speed position of the automatic transmission 16 actually established under the control of the shift control means 114, a speed reduction ratio i of a differential gear device, etc., and an effective tire radius $r_w$ of the drive wheels. The engine-output control means 116 calculates a target throttle valve opening angle $\theta_{TH}^*$ corresponding to the estimated engine torque value $T_{E0}$ for obtaining the target engine torque $T_E^*$, on the basis of the actual engine speed $N_E$, and according to the stored relationship (map) of FIG. 5 obtained by experimentation. The engine-output control means 116 commands the throttle actuator 54 to control the electronic throttle valve 56 so as to establish the calculated target throttle valve opening angle $\theta_{TH}^*$.

Thus, the shift control means 114 controls the speed ratio γ of the automatic transmission 16 while the engine-output control means 116 controls the engine torque $T_E$, so as to obtain the target vehicle drive force $F_{tgt}$ (=$T_E^* \times \gamma \times i/r_w$). The target vehicle drive force F may be obtained by only one of the shift control means 114 and the engine-output control means 116, depending upon the value of the target vehicle drive force $F_{tgt}$.

Generated-drive-force calculating means 118 calculates a drive force $F_{real}$ actually generated by the drive wheels (hereinafter referred to as "generated drive force"), on the basis of the actual engine torque $T_E$. For example, the generated-drive-force calculating means 118 calculates the generated drive force $F_{real}$, according to an equation $F_{real}=T_E \times \gamma \times i/r_w$, on the basis of the actual engine torque $T_E$, the speed ratio $\gamma$ of the speed position of the automatic transmission 16 actually established under the control of the shift control means 114, the speed reduction ratio i of the differential gear device, etc., and the effective tire radius $r_w$ of the drive wheels. The engine torque $T_E$ described above is estimated as the estimated engine torque value $T_{E0}$ by the generated-drive-force calculating means 118, on the basis of the actual engine speed $T_E$ and the actual throttle valve opening angle $\theta_{TH}$, and according to the stored relationship (map) of FIG. 5. The actual throttle valve opening angle $\theta_{TH}$ used to obtain the estimated engine torque value $T_{E0}$ is a value detected by the throttle-valve opening sensor 64 while the throttle valve opening angle $\theta_{TH}$ is controlled by the engine-output control means 116 so as to establish the target throttle valve opening angle $\theta_{TH}*$. Accordingly, the generated drive force $F_{real}$ is a vehicle drive force F actually generated so as to establish the target vehicle drive force $F_{tgt}$, on the basis of the required vehicle output in the form of the accelerator pedal operating amount $A_{CC}$.

Reference acceleration calculating means 120 is arranged to calculate a reference acceleration value $G_b$ of the vehicle on the basis of the generated drive force $F_{real}$ calculated by the above-described generated-drive-force calculating means 118, and the vehicle running resistance $f_{res}$ calculated by the above-described running-resistance calculating means 112. For instance, the reference acceleration calculating means 120 calculates the reference vehicle acceleration value $G_b$ according to an equation $G_b=(F_{real}-f_{res})/(W+W_r)$, on the basis of the generated drive force $F_{real}$ the vehicle running resistance $f_{res}$, the weight W, and an equivalent inertia mass $W_r$. The equivalent inertia mass $W_r$ is a stored predetermined value of an inertia mass of a rotary portion of a power transmitting system of the vehicle including the engine 18, which value is obtained by converting the inertia moment into a weight on an effective radius of the drive shaft.

The above-described reference vehicle acceleration value $G_b$ is a vehicle acceleration value G to be obtained by the generated drive force $F_{real}$ on the level roadway. This reference vehicle acceleration value $G_b$ is a vehicle acceleration value G which is compared with an actual vehicle acceleration value $G_s$ obtained by the generated drive force $F_{real}$, to determine a gradient $\theta$ of the roadway on which the vehicle is actually running. As described above, the generated drive force $F_{real}$ is the drive force F actually generated on the basis of the required vehicle output in the form of the accelerator pedal operating amount $A_{CC}$. Therefore, the reference vehicle acceleration value Gb is an acceleration value G to be generated on the basis of the actual operating amount $A_{CC}$ during running of the vehicle on the level roadway, while on the other hand the actual vehicle acceleration value $G_s$ is an acceleration value G actually established on the basis of the actual accelerator pedal operating amount $A_{CC}$.

Actual acceleration detecting means 122 is arranged to detect the actual vehicle acceleration value Gs on the basis of an output of the vehicle acceleration sensor 80. A gradient resistance $R_i$ at a given value of the generated drive force $F_{real}$, namely, at a given value of the accelerator pedal operating amount $A_{CC}$ increases with an increase of the gradient $\theta$ of an uphill roadway, so that the actual vehicle acceleration value $G_s$ decreases with an increase of the gradient $\theta$.

Acceleration difference calculating means 124 is arranged to calculate an acceleration difference G' (=$G_b-G_s$) between the reference vehicle acceleration value $G_b$ calculated by the reference acceleration calculating means 120 and the actual vehicle acceleration value $G_s$ detected by the actual acceleration detecting means 122. This acceleration difference G' obtained by comparing the actual vehicle acceleration value $G_s$ with the reference vehicle acceleration value $G_b$ represents the gradient $\theta$ of the roadway on which the vehicle is actually running. The roadway gradient $\theta$ increases with an increase of this acceleration difference G'.

Acceleration difference determining means 126 is arranged to determine whether the acceleration difference G' calculated by the acceleration difference calculating means 124 is larger than a predetermined uphill-roadway determining threshold $\alpha$. This uphill-roadway determining threshold $\alpha$ is a stored value which is obtained by experimentation and above which a drive force control (uphill-drive-force control) by uphill-drive-force control means 130 (which will be described) is required to increase the vehicle drive force F during the uphill-road running of the vehicle.

Roadway-gradient compensation-amount calculating means 128 is arranged to calculate a roadway-gradient compensation amount $F_{grade}$ (=map ($G_b$, vehicle speed V)) on the basis of the reference vehicle acceleration value $G_b$ calculated by the reference acceleration calculating means 120 and the actual vehicle speed V, and according to a stored map which is obtained by experimentation and which represents a relationship among the roadway-gradient compensation amount $F_{grade}$, the reference vehicle acceleration value $G_b$ and the vehicle speed V.

The above-described uphill-drive-force control means 130 is operated when the acceleration difference determining means 126 has determined that the acceleration difference G' is larger than the uphill-roadway determining threshold $\alpha$. The uphill-drive-force control means 130 is arranged to calculate a new target vehicle drive force $F_{tgt}'$ (=$F_{tgt}$+$F_{grade}$) which is a sum of the target drive force $F_{tgt}$ calculated by the target-drive-force calculating means 110 and the roadway-gradient compensation amount $F_{grade}$ calculated by the roadway-gradient compensation-amount calculating means 128. The uphill-drive-force control means 130 commands the engine output control means 1156 and/or the shift control means 114, to obtain the new target drive force $F_{tgt}'$, for obtaining substantially the same acceleration value $G_b$ during an uphill-road running of the vehicle as that during the level-road running, at substantially the same required vehicle output (substantially the same accelerator pedal operating amount $A_{CC}$) during the uphill-road running as that during the level-road running.

Usually, the user of the vehicle expects a decrease of the vehicle acceleration value G after initiation of a vehicle running on an uphill roadway having a relatively large gradient $\theta$ following a vehicle running on the level roadway. If the vehicle drive force F is increased by the uphill-drive-force control means 130 for the uphill-road running, the user tends to feel uneasy upon initiation of the uphill-road running because the user does not feel a decrease of the vehicle acceleration value as expected after initiation of the uphill road running.

In view of the drawback indicated above, delay control means 131 is provided to delay the initiation of the uphilldrive-force control by the uphill-drive-force control means 130, for inhibiting an increase of the vehicle drive force F for a predetermined first time period T1 after the moment of initiation of the uphill-road running of the vehicle. For instance, the delay control means 131 delays the initiation of the uphill-drive-force control means by the uphill-drive-force control means 130 to inhibit the increase of the vehicle drive force F for the predetermined first time period T1, even where the acceleration difference determining means 126 has determined that the acceleration difference G' has exceeded the predetermined uphill-roadway determining threshold α. In other words, the delay control means 131 permits the uphill-drive-force control means 130 to initiate the uphill-drive-force control for increasing the vehicle drive force F, when a time period during which the acceleration difference determining means 126 continues to determine that the acceleration difference G' is larger than the predetermined uphill-roadway determining threshold α has exceeded the predetermined first time period T1. There will be described an example of a control operation of the delay control means 131 to delay the initiation of the uphill-drive-force control by the uphill-drive-force control means 130. The delay control means 131 includes first period measuring means 132, first period determining means 134, compensation-flag setting means 136, compensation flag determining means 138 and the above-described roadway-gradient compensation-amount calculating means 128.

The first period measuring means 132 is arranged to measure a time period $T_{\alpha 1}$ during which the acceleration difference determining means 126 continues to determine that the acceleration difference G' is larger than the uphill-roadway determining threshold α.

The first period determining means 134 is arranged to determine whether the time period $T_{\alpha 1}$ measured by the first period measuring means 132 has exceeded the predetermined first time period T1. The first time period T1 is a predetermined period of time during which the initiation of the uphill-drive-force control by the uphill-drive-force control means 130 is delayed after the moment of determination by the acceleration difference determining means 126 has determined that the Acceleration difference G' had exceeded the uphill-roadway determining threshold α. The first time period T1 is a stored period of time of about 0.1-0.9 second, for example, which is obtained by experimentation, so as to permit the user of the vehicle to be able to feel a decrease of the vehicle acceleration value G as expected after the initiation of an uphill-road running of the vehicle, thereby preventing the vehicle user from otherwise feeling uneasy upon initiation of the uphill-road running.

The compensation-flag setting means 136 is arranged to set a compensation flag A in an ON state when the first period determining means 134 has determined that the time period $T_{\alpha 1}$ measured by the first period measuring means 132 had exceeded the predetermined first time period T1. The compensation flag A placed in its ON state indicates that the uphill-drive-force control should be initiated by the uphill-drive-force control means 130. The compensation-flag setting means 136 holds the compensation flag A in an OFF state to inhibit the initiation of the uphill-drive-force control by the uphill-drive-force control means 130, until the first period determining means 134 has determined that the time period $T_{\alpha 1}$ has exceeded the predetermined first time period T1.

The compensation flag determining means 138 is arranged to determine whether the compensation flag A set by the compensation-flag setting means 136 is placed in its ON state or not.

When the compensation flag determining means 138 has determined that the compensation flag A is placed In the ON state, the roadway-gradient compensation-amount calculating means 128 calculates the roadway-gradient compensation amount $F_{grade}$ (=map ($G_b$, vehicle speed V)) on the basis of the reference vehicle acceleration value $G_b$ and the actual vehicle speed V, and according to the stored map which is obtained by experimentation and which represents the relationship among the roadway-gradient compensation amount $F_{grade}$, the reference vehicle acceleration value $G_b$ and the vehicle speed V Until the compensation flag determining means 138 has determined that the compensation flag A is placed in the ON state, that is, when the compensation flag determining means 138 has determined that the compensation flag A is placed in its OFF state, the roadway-gradient compensation-amount calculating means 128 sets the roadway-gradient compensation amount $F_{grade}$ to be zero ($F_{grade}$=0).

As described above, the roadway-gradient compensation amount $F_{grade}$ is zeroed by the roadway-gradient compensation-amount calculating means 128 until the first period determining means 134 has determined that the first time period $T_{\alpha 1}$ measured by the first time measuring means 132 had exceeded the predetermined first time period T1, even where the acceleration difference determining means 126 has determined that the acceleration difference G' is larger than the uphill-roadway determining threshold α. Accordingly, the vehicle drive force F is not actually increased by the uphill-drive-force control means 130 immediately after initiation of an uphill-road running of the vehicle. Thus, the initiation of the uphill-drive-force control by the uphill-drive-force control means 130 is delayed by the delay control means 131.

If an increase of the vehicle drive force F is not initiated until the first predetermined time T1 has passed, even where the vehicle operator further depresses the accelerator pedal 50 before the predetermined first time period T1 has passed after the moment of initiation of the uphill-road running of the vehicle, namely, before the first time determining means 134 has determined that the time period $T_{\alpha 1}$ measured by the first period measuring means 132 had exceeded the predetermined first time T1, the vehicle operator who desired an increase of the vehicle drive force F and therefore depressed the accelerator pedal 50 recognizes a decrease of the vehicle acceleration value G, and may feel uneasy with this decrease.

In view of the above, the delay control means 131 further includes required-output increase-amount determining means 140 arranged to determine whether the amount of increase of the required vehicle output has exceeded a predetermined value. For instance, the required-output increase-amount determining means 140 determines whether an amount of change $\Delta A_{CC}$ of the accelerator pedal operating amount $A_{CC}$ has exceeded a predetermined value $\Delta A_{CC}1$, which is a stored predetermined value which is obtained by experimentation and above which it is considered that the vehicle operator has increased the required vehicle output (depressed the accelerator pedal 50) to increase the vehicle drive force F.

The compensation-flag setting means 136 described above is arranged to set the compensation flag A in the ON state, rather than in the OFF state, if the required-output increase-amount determining means 140 has determined that the amount of increase of the required vehicle output had exceeded the predetermined value, even where the first period determining means 134 has determined that the time period $T_{\alpha1}$ measured by the first period measuring means 132 had exceeded the predetermined first time period T1.

Thus, if the required-output increase-amount determining means 140 has determined that the amount of increase of the required output had exceeded the predetermined value, before the first period determining means 134 has determined that the time period $T_{\alpha1}$ measured by the first period measuring means 132 had exceeded the predetermined first time period T1, the roadway-gradient compensation-amount calculating means 128 calculates (determines) the roadway-gradient compensation amount $F_{grade}$ (=map ($G_b$, vehicle speed V)), and the uphill-drive-force control by the uphill-drive-force control means 130 is initiated by the delay control means 131, so that the vehicle drive force F is increased by the uphill-drive-force control means 130 during the uphill-road running of the vehicle.

As described above, the vehicle drive force F is suitably increased by the uphill-drive-force control means 130 when the acceleration difference determining means 126 has determined that the vehicle acceleration difference G' had exceeded the uphill-roadway determining threshold α. If the acceleration difference determining means 126 has determined that the vehicle acceleration difference G' is not larger than the uphill-roadway determining threshold α, during the uphill-drive-force control by the uphill-drive-force control means 130, on the other hand, the uphill-drive-force control means 130 terminates an increase of the vehicle drive force F. Therefore, if the roadway gradient changes such that the vehicle acceleration difference G' alternately increases above and decreases below the uphill-roadway determining threshold α, the uphill-drive-force control means 130 alternately implements and inhibits the uphill-drive-force control according to a change of the roadway gradient. The uphill-drive-force control means 130 may suffer from instability of the uphill-drive-force control due to a relatively short cycle of repetition of the implementation and inhibition of the uphill-drive-force control in response to a relatively high frequency of change of the roadway gradient, and the vehicle operator may feel uneasy with this phenomenon.

There will be described in further detail an operation to control the response of an increase of the vehicle drive force F by the uphill-drive-force control means 130. As described above, the initiation of an increase of the vehicle drive force F by the uphill-drive-force control means 130 is delayed by the predetermined first time period T1, thereby preventing the vehicle operator from feeling uneasy with a high response of the increase of the vehicle drive force F to a change of the roadway gradient. The first time period T1 is a stored predetermined length of time which is obtained by experimentation and which is a lower limit above which the increase of the vehicle drive force F does not have such a high response to a change of the roadway gradient, with which the vehicle operator feels uneasy.

Uphill-drive-force-control termination control means 141 is provided to continue the uphill-drive-force control by the uphill-drive-force control means 130 for a predetermined second time period T2 after the moment of termination of an uphill-road running of the vehicle. For instance, the uphill-drive-force-control termination control means 141 commands the uphill-drive-force control means 130 to continue an increase of the vehicle drive force F until the second time period T2 has passed after the moment of determination by the acceleration difference determining means 126 that the vehicle acceleration difference G' is not larger than the uphill-roadway determining threshold α. In other words, the uphill-drive-force-control termination determining means 141 terminates the uphill-drive-force control by the uphill-drive-force control means 130, to inhibit an increase of the vehicle drive force F, when the time period during which the acceleration difference determining means 126 continues to determine that the vehicle acceleration difference G' is not larger than the uphill-roadway determining threshold α has exceeded the predetermined second time period T2 There will be described an example of an operation of the uphill-drive-force-control termination determining means 141 to continue the uphill-drive force control by the uphill-drive-force control means 130, in other words, to inhibit the termination of the uphill-drive-force control by the uphill-drive-force control means 130. The uphill-drive-force-control termination determining means 141 includes second period measuring means 142, second period determining means 144 and the above-described roadway-gradient compensation-amount calculating means 128.

The second period measuring means 142 is arranged to measure a time period $T_{\alpha2}$ during which the acceleration difference determining means 126 continues to determine that the vehicle acceleration difference G' is not larger than the uphill-roadway determining threshold α.

The second period determining means 144 is arranged to determine whether the time period $T_{\alpha2}$ measured by the second period measuring means 142 has exceeded the predetermined second time period T2. The second time period T2 is a predetermined period of time during which the uphill-drive-force control by the uphill-drive-force control means 130 is continued even while the acceleration difference determining means 126 determines that the vehicle acceleration difference G' is not larger than the uphill-roadway determining threshold α. The second time period T2 is a stored period of time of about 0.1-0.9 second, for example, which is obtained by experimentation and which is a lower limit above which the termination of the uphill-drive-force control does not have such a high response to a change of the roadway gradient with which the vehicle operator feels uneasy.

The roadway-gradient compensation-amount calculating means 128 is further arranged to hold the present roadway-gradient compensation amount $F_{grade}$ until the second period determining means 144 has determined that the time period $T_{\alpha2}$ measured by the second period measuring means 142 had exceeded the predetermined second time period T2. When the second period determining means 144 has determined that the time period $T_{\alpha2}$ measured by the second period measuring means 142 had exceeded the predetermined second time period T2, the roadway-gradient compensation-amount calculating means 128 sets the roadway-gradient compensation amount $F_{grade}$ to be zero ($F_{grade}$=0).

Thus, the roadway-gradient compensation amount $F_{grade}$ presently calculated by the roadway-gradient compensation-amount calculating means 128 is maintained, that is, is not zeroed, until the second period determining means 144 has determined that the time period $T_{\alpha2}$ measured by the second period measuring means 142 had exceeded the predetermined second time period T2. even while the acceleration difference determining means 126 determines that the vehicle acceleration difference G' is not larger than the uphill-roadway determining threshold α. Accordingly, the increase of the vehicle drive force F by the uphill-drive-force control means 130 for the uphill-running of the vehicle is continued, that is, the uphill-drive-force control by the uphill-drive-force control by the uphill-drive-force control means 130 is continued by the uphill-drive-force-control termination determining means 141.

Referring to the flow chart of FIG. 9, there will be described major control functions of the electronic control device 90, namely, control operations to effect the uphill-drive-force control for increasing the vehicle drive force F during an uphill-road running of the vehicle at a given required vehicle output in the form of the accelerator pedal operating amount $A_{CC}$ as compared with the vehicle drive force during a level-road running of the vehicle at substantially the same required vehicle output, for obtaining substantially the same acceleration value G of the vehicle during the uphill-road running as that during the level-road running, while reducing a degree of uneasiness to be given to the vehicle user (operator and occupants) during the uphill-road running.

Figure 9:
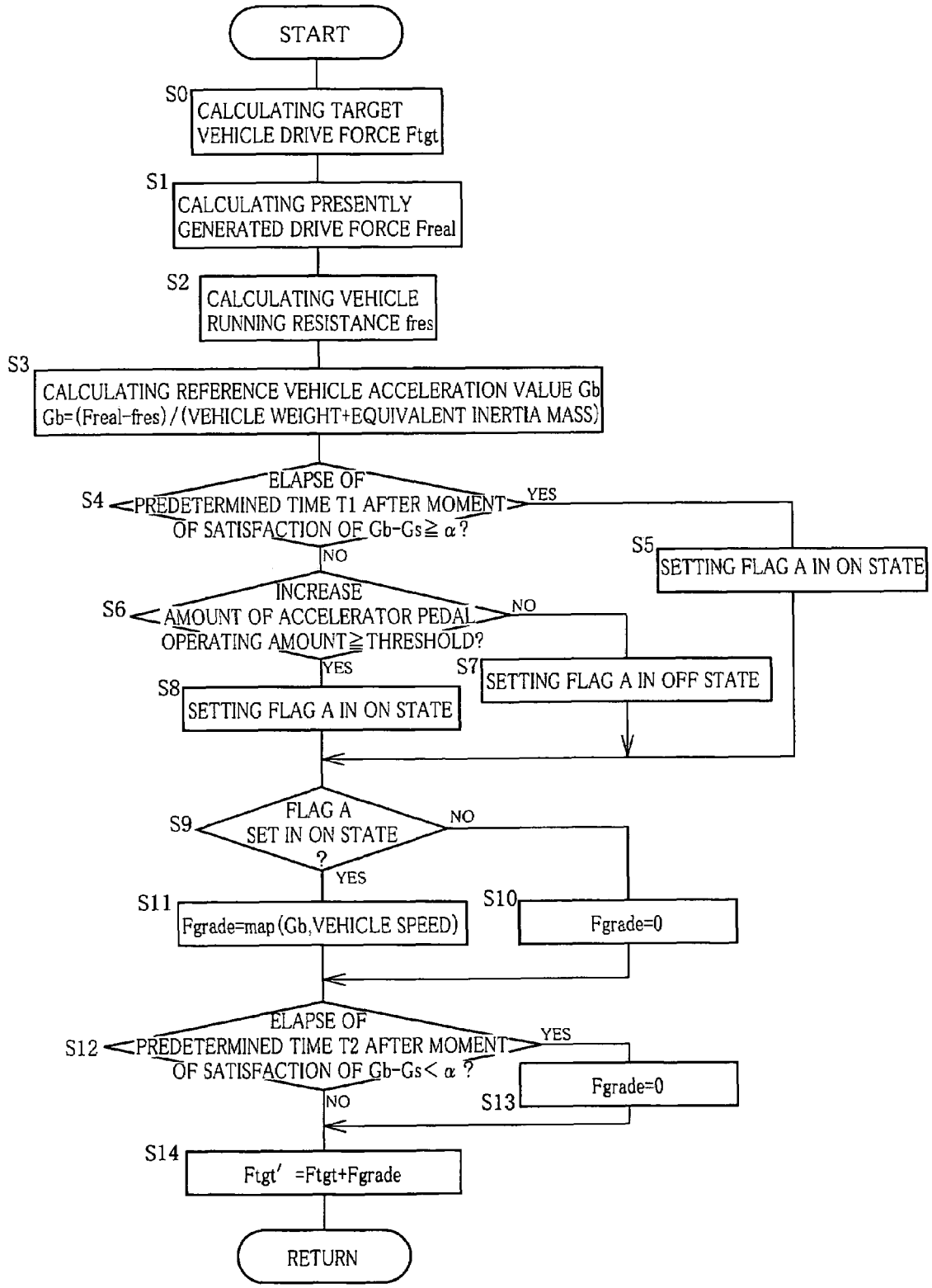
FIG. 9 is a flow chart illustrating major control functions of the electronic control device of FIG. 3, namely, control operations to effect an uphill-drive-force control for increasing a vehicle drive force during an uphill-road running of the vehicle at a given required vehicle output as compared with a vehicle drive force during a level-road running of the vehicle at substantially the same required vehicle output, for obtaining substantially the same acceleration value of the vehicle during the uphill-road running as that during the level-road running, while reducing a degree of uneasiness to be given to the vehicle operator during the uphill-road running.

As shown in FIG. 9, steps S0, S1 and S2 ("step" being hereinafter omitted) respectively corresponding to the above-described target-drive-force calculating means 110, running resistance calculating means 112 and generated-drive-force calculating means 118 are implemented to calculate the target vehicle drive force $F_{tgt}$, the presently generated vehicle drive force $F_{real}$ and the vehicle running resistance $f_{res}$, respectively. For instance, the target vehicle acceleration value G* is determined on the basis of the actual vehicle speed V and accelerator pedal operating amount $A_{CC}$, and according to the stored relationship shown in FIG. 8 and obtained by experimentation, among the accelerator pedal operating amount $A_{CC}$, vehicle speed V and target vehicle acceleration value G*, and the target vehicle drive force $F_{tgt}$ is calculated according to the equation $F_{tgt}=f(G^*)=W \times G^* + f_{res}$, on the basis of the determined target vehicle acceleration value G*, the vehicle running resistance $f_{res}$ during running of the vehicle on the level roadway, and the vehicle weight W. The vehicle running resistance $f_{res}$ is a sum the rolling resistance $R_r$ and the air resistance $R_a$, and is represented as $f_{res}=R_r+R_a$. For instance, the vehicle running resistance $f_{res}$ is calculated on the basis of the actual vehicle speed V and according to the stored map obtained by experimentation and representing the relationship between the vehicle running resistance $f_{res}$ and the vehicle speed V Further, the generated vehicle drive force $F_{real}$ is calculated according to the equation $F_{real}=T_E \times \gamma \times i/r_w$, on the basis of the actual engine torque $T_E$, the speed ratio $\gamma$ of the speed position of the automatic transmission 16 actually established under the control of the shift control means 114, the speed reduction ratio i of the differential gear device, etc., and the effective tire radius $r_w$ of the drive wheels. The engine torque $T_E$ described above is estimated as the estimated engine torque value $T_{E0}$ on the basis of the actual engine speed $T_E$ and the actual throttle valve opening angle $\theta_{TH}$, and according to the stored relationship (map) shown in FIG. 5.

The above-described S0 through S2 are followed by S3 corresponding to the above-described reference acceleration calculating means 120, to calculate the reference vehicle acceleration value Gb according to the equation $G_b=(F_{real}-f_{res})/(W+W_r)$, on the basis of the generated drive force $F_{real}$ calculated in S1, the vehicle running resistance $f_{res}$ calculated in S2, the vehicle weight W, and the equivalent inertia mass $W_r$.

The above-described S3 is followed by S4 corresponding to the above-described actual acceleration detecting means 122, acceleration difference calculating means 124, acceleration difference determining means 126, first period measuring means 132 and first period determining means 134, to first determine whether the vehicle acceleration difference G' ($=G_b-G_s$) between the reference vehicle acceleration value $G_b$ calculated in S3 and the actual vehicle acceleration value $G_s$ detected by the vehicle acceleration sensor 80 is larger than the predetermined uphill-roadway determining threshold $\Delta$, measure the time period $T_{\alpha 1}$ during which the calculated vehicle acceleration difference G' is kept larger than the uphill-roadway determining threshold, and determine whether the measured time period $T_{\alpha 1}$ has exceeded the predetermined first time period T1.

If an affirmative decision is obtained in the above-described S4, the control flow goes to S5 corresponding to the above-described compensation-flag setting means 136, to set the compensation flag A in the ON state. If a negative decision is obtained in the above-described S4, the control flow goes to S6 corresponding to the required-output increase-amount determining means 140, to determine whether the amount of increase $\Delta A_{CC}$ of the accelerator pedal operating amount $A_{CC}$ is larger than the predetermined value $\Delta A_{CC}1$. If a negative decision is obtained in this S6, the control flow goes to S7 corresponding to the above-described compensation-flag setting means 136, to set the compensation flag A in the OFF state. If an affirmative decision is obtained in the S6, the control flow goes to S8 also corresponding to the compensation-flag setting means 136, to set the compensation flag A in the ON state.

The above-described S5, S7 or S8 is followed by S9 corresponding to the compensation-flag determining means 138, to determine whether the compensation flag A set in the S5, S7 or S8 is placed in the ON state. If a negative decision is obtained in this S9, the control flow goes to S10 corresponding to the above-described roadway-gradient compensation-amount calculating means 128, to zero the roadway-gradient compensation amount $F_{grade}$ ($F_{grade}=0$). If an affirmative decision is obtained in the S9, the control flow goes to S11 also corresponding to the roadway-gradient compensation-amount calculating means 128, to calculate (determine) the roadway-gradient compensation amount $F_{grade}$ (=map ($G_b$, vehicle speed V)) on the basis of the reference vehicle acceleration value $G_b$ calculated in the above-described S3 and the actual vehicle speed V, and according to the stored relationship (map) among the reference acceleration value $G_b$, vehicle speed V and roadway-gradient compensation amount $F_{grade}$, which relationship is obtained by experimentation.

The above-described S10 or S11 is followed by S12 corresponding to the above-described actual acceleration detecting means 122, acceleration difference calculating means 124, acceleration difference determining means 126, second period measuring means 142 and second period determining means 144, to first calculate the acceleration difference G' ($=G_b-G_s$) between the reference vehicle acceleration value $G_b$ calculated in the above-described S3 and the actual vehicle acceleration value $G_s$ detected by the acceleration sensor 80, determine whether the calculated vehicle acceleration difference G' is not larger than the predetermined uphill-roadway determining threshold $\alpha$, measure the time period $T_{\alpha 2}$ during which the vehicle acceleration difference G' is not larger than the uphill-roadway determining threshold $\alpha$, and determine whether the time period $T_{\alpha 2}$ has exceeded the predetermined second time period T2.

If an affirmative decision is obtained in the above-described S12, the control flow goes to S13 corresponding to the roadway-gradient compensation-amount calculating means 128, to zero the roadway-gradient compensation amount $F_{grade}$ ($F_{grade}=0$). If a negative decision is obtained in the S12, or after implementation of the above-described S13, the control flow goes to S14 corresponding to the above-described uphill-drive-force control means 130, to add, to the target vehicle drive force $F_{tgt}$ calculated in the above-described S0, the roadway-gradient compensation amount $F_{grade}$ calculated (determined) in the above-described S10, S11 or S13, for thereby calculating the new target vehicle drive force $F_{tgt}'$ ($=F_{tgt}+F_{grade}$). The engine output control means 116 and/or the shift control means 114 is/are controlled to obtain the calculated new target vehicle drive force $F_{tgt}$. This step is not shown in the flow chart of FIG. 9.

In the present embodiment described above, the initiation of the uphill-drive-force control by the uphill-drive-force control means 130 is delayed by the delay control means 131, until the predetermined first time period T1 has passed after the moment of initiation of an uphill running of the vehicle. Accordingly, the vehicle drive force F is not increased until the first time period T1 has passed after the initiation of the uphill running of the vehicle. For instance, the vehicle acceleration difference G' between the reference vehicle acceleration $G_b$ calculated by the reference acceleration calculating means 120 and the actual vehicle acceleration $G_s$ detected by the actual acceleration detecting means 122 is calculated by the acceleration difference calculating means 124, and the time period $T_{\alpha 1}$ during which the calculated vehicle acceleration difference G' is larger than the predetermined uphill-roadway determining threshold α is measured by the first period measuring means 132. The initiation of the uphill-drive-force control by the uphill-drive-force control means 130 is delayed by the delay control means 131, until the first period determining means 134 has determined that the time period $T_{\alpha 1}$ had exceeded the predetermined first period T1. Accordingly, the vehicle drive force F is not increased for the predetermined first period T1 after the moment of initiation of the uphill-road running of the vehicle on a roadway the gradient θ of which requires the uphill-drive-force control by the uphill-drive-force control means 130. Therefore, immediately after initiation of the uphill-road running of the vehicle, the vehicle operator can feel a decrease of the vehicle acceleration G as expected upon initiation of the uphill-road running, so that the vehicle operator is less likely to feel uneasy during the uphill-road running.

The present embodiment is further arranged such that the delay control means 131 permits the initiation of the uphill-drive-force control by the uphill-drive-force control means 130 when the amount of change of the required vehicle output in the form of the amount of change $\Delta A_{CC}$ of the accelerator pedal operating amount $A_{CC}$ has exceeded the predetermined value $\Delta A_{CC}1$, even before the predetermined first time period T1 has passed after the moment of initiation of the uphill-road running of the vehicle, for example, even before the first period determining means 134 has determined that the first predetermined time period T1 has passed. Accordingly, the vehicle drive force F is obtained according to the accelerator pedal operating amount $A_{CC}$, so that the vehicle operator does not feel uneasy upon initiation of the uphill-road running. In other words, the amount of change $\Delta A_{CC}$ of the accelerator pedal operating amount $A_{CC}$ exceeding the predetermined value $\Delta A_{CC}1$ indicates a depressing operation of the accelerator pedal 50 by the vehicle operator to increase the vehicle acceleration G as a result of the vehicle operator's expectation of a decrease of the vehicle acceleration G immediately before initiation of an uphill-road running of the vehicle. If an increase of the vehicle drive force F by the uphill-drive-force control means 130 was inhibited for the predetermined time after the moment of initiation of the uphill-road running, the vehicle operator would feel a decrease of the vehicle acceleration G and feel uneasy with this decrease because the vehicle operator desired the increase of the vehicle drive force F and depressed the accelerator pedal 50. In view of this drawback, the uphill-drive-force control by the uphill-drive-force control means 130 is initiated even before expiration of the predetermined first time period T1, if the amount of change $\Delta A_{CC}$ of the accelerator pedal operating amount $A_{CC}$ has exceeded the predetermined value $\Delta A_{CC}1$. Accordingly, the vehicle operator does not feel uneasy upon initiation of the uphill-road running.

The present embodiment is further arranged such that the uphill-drive-force control by the uphill-drive-force control means 130 is continued by the uphill-drive-force-control termination determining means 141 until the predetermined second time period T2 has passed after the moment of termination of the uphill-road running of the vehicle, so that the vehicle drive force F is kept increased for the predetermined second time period T2 even after the termination of the uphill-road running of the vehicle. The time period $T_{\alpha 2}$ during which the acceleration difference determining means 126 continues to determine that the vehicle acceleration difference G' is not larger than the uphill-roadway determining threshold α is measured by the second period measuring means 142, and the uphill-drive-force control by the uphill-drive-force control means 130 is continued until the second period determining means 144 has determined that the time period $T_{\alpha 2}$ measured by the second period measuring means 142 has exceeded said predetermined second time period T2. Accordingly, the vehicle drive force F is kept increased for the predetermined second time period T2 even after the moment of termination of the uphill-road running of the vehicle on a roadway the gradient θ of which requires the uphill-drive-force control by the uphill-drive-force control means 130. Therefore, it is possible to prevent instability of the uphill-drive-force control by the uphill-drive-force control means 130 due to a high response of the termination of the uphill-drive-force control to a change of the roadway gradient, with which the vehicle operator feels uneasy.

While one embodiment of this invention has been described above in detail by reference to the drawings, it is to be understood that the present invention may be otherwise embodied.

For example, the engine output control means 116 arranged to control the throttle actuator 54 for controlling the electronic throttle valve 56 to control the engine torque $T_E$ in the illustrated embodiment may be modified to control the engine torque $T_E$ by controlling the fuel injecting valve 92 for controlling the amount of fuel injection, or control the igniter 54 for controlling the ignition timing.

In the illustrated embodiment, the uphill-drive-force control means 130 is arranged to initiate the uphill-drive-force control when the acceleration difference determining means 126 has determined that the vehicle acceleration difference G' had exceeded the predetermined uphill-roadway determining threshold α. However, the uphill-drive-force control means 130 is not limited to this arrangement, and may initiate the uphill-drive-force control otherwise, for instance, when the gradient θ of an uphill roadway has exceeded a predetermined threshold value. The roadway gradient θ may be calculated on the basis of an output signal of the acceleration sensor 80 which represents a gravitational acceleration value g of the vehicle.

The roadway-gradient compensation-amount calculating means 128 in the illustrated embodiment is arranged to calculate the roadway-gradient compensation amount $F_{grade}$ (=map ($G_b$, vehicle speed V)) on the basis of the reference vehicle acceleration value $G_b$ calculated by the reference acceleration calculating means 120 and the actual vehicle speed V, and according to the stored map which is obtained by experimentation and which represents the relationship among the roadway-gradient compensation amount $F_{grade}$, the reference vehicle acceleration value $G_b$ and the vehicle speed V. However, the roadway-gradient compensation-amount calculating means 128 is not limited to this arrangement, and may calculate, as the roadway-gradient compensation amount $F_{grade}$, a gradient resistance $R_t$ (=W×sin θ, wherein "W" represents the vehicle weight, and "θ" represents the gradient of the roadway).

It is to be understood that the preferred embodiment of present invention has been described for illustrative purpose only, and that the present invention may be embodied with various other changes and modifications which may occur to those skilled in the art.

The invention claimed is:

1. A control apparatus for a vehicular drive system which has a drive power source and an automatic transmission operatively connected to said drive power source, and in which a drive force is transmitted from said drive power source to a drive wheel of a vehicle through said automatic transmission, said control apparatus including uphill-drive-force control means for controlling the drive power source and/or the automatic transmission to increase a drive force of the vehicle during an uphill-road running of the vehicle at a given required vehicle output as compared with a drive force during a level-road running of the vehicle, at substantially the same required vehicle output, for obtaining substantially the same value of acceleration of the vehicle during the uphill-road running as that during the level-road running, said control apparatus comprising:
   delay control means for delaying initiation of a drive force control by said uphill-drive-force control means for said uphill-road running of the vehicle, until a predetermined first time period has passed after a moment of initiation of said uphill-road running;
   reference acceleration calculating means for calculating a reference acceleration of the vehicle on the basis of an actually generated drive force of the vehicle;
   actual acceleration detecting means for detecting an actual acceleration of the vehicle;
   acceleration difference calculating means for calculating an acceleration difference between said reference acceleration calculated by said reference acceleration calculating means and said actual acceleration detected by said actual acceleration detecting means; and
   acceleration difference determining means for determining whether said acceleration difference calculated by said acceleration difference calculating means is larger than an uphill-roadway determining threshold above which a roadway on which the vehicle is running is an uphill roadway a gradient of which requires the drive force control by said uphill-drive-force control means, and wherein said delay control means includes first period measuring means for measuring a time period during which said acceleration difference determining means determines that said acceleration difference is held larger than said uphill-roadway determining threshold, and first period determining means for determining whether said time period measured by said first period measuring means has exceeded said predetermined first time period during which the initiation of the drive force control by said uphill-drive-force control means is delayed, said delay control means delaying the initiation of the drive force control by said uphill-drive-force control means until said first period determining means has determined that said time period measured by said first period measuring means had exceeded said predetermined first time period.

2. The control apparatus according to claim 1, wherein said delay control means permits the drive force control by said uphill-drive-force control means when an amount of increase of said required vehicle output has exceeded a predetermined value, even before said predetermined first time period has passed after the moment of initiation of said uphill-road running of the vehicle.

3. The control apparatus according to claim 2, further comprising uphill-drive-force-control termination determining means for continuing the drive force control by said uphill-drive-force control means for a predetermined second time period after a moment of termination of said uphill-road running of the vehicle.

4. The control apparatus according to claim 3, wherein said uphill-drive-force-control termination determining means includes second period measuring means for measuring a time period during which said acceleration difference determining means continues to determine that the vehicle acceleration difference is not larger than said uphill-roadway determining threshold, and second period determining means for determining whether said time period measured by said second period measuring means has exceeded said predetermined second time period for which the drive force control by said uphill-drive-force control means is continued, said uphill-drive-force-control termination determining means continuing the drive force control by said uphill-drive-force control means for said predetermined second time period until said second period determining means has determined that the time period measured by said second period measuring means has exceeded said predetermined second time period.

5. The control apparatus according to claim 1, further comprising uphill-drive-force-control termination determining means for continuing the drive force control by said uphill-drive-force control means for a predetermined second time period after a moment of termination of said uphill-road running of the vehicle.

6. The control apparatus according to claim 5, wherein said uphill-drive-force-control termination determining means includes second period measuring means for measuring a time period during which said acceleration difference determining means continues to determine that the vehicle acceleration difference is not larger than said uphill-roadway determining threshold, and second period determining means for determining whether said time period measured by said second period measuring means has exceeded said predetermined second time period for which the drive force control by said uphill-drive-force control means is continued, said uphill-drive-force-control termination determining means continuing the drive force control by said uphill-drive-force control means for said predetermined second time period until said second period determining means has determined that the time period measured by said second period measuring means has exceeded said predetermined second time period.

* * * * *